(12) United States Patent
Hassan et al.

(10) Patent No.: US 6,234,751 B1
(45) Date of Patent: *May 22, 2001

(54) OSCILLATING AIR JETS FOR REDUCING HSI NOISE

(75) Inventors: Ahmed A. Hassan, Mesa; Hormoz Tadghighi, Gilbert; Ram D. Janakiram, Mesa, all of AZ (US)

(73) Assignee: McDonnell Douglas Helicopter Co., Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/198,843

(22) Filed: Nov. 24, 1998

Related U.S. Application Data

(63) Continuation-in-part of application No. 08/869,725, filed on Jun. 5, 1997, and a continuation-in-part of application No. 08/869,372, filed on Jun. 5, 1997, now Pat. No. 5,938,404.
(60) Provisional application No. 60/071,140, filed on Jan. 12, 1998, and provisional application No. 60/071,142, filed on Jan. 12, 1998.

(51) Int. Cl.$^7$ .................................................. B64C 27/04
(52) U.S. Cl. .............................. 416/42; 416/3; 416/90 A; 416/91; 416/500; 415/119; 244/130; 244/199; 244/203; 244/204; 244/208
(58) Field of Search .................................. 416/3, 23, 24, 416/90 R, 90 A, 91, 42, 20 R, 155, 500; 415/119, 181, 914; 244/198, 199, 203, 204, 207, 208, 130; 239/265.33, 265.35, 265.23

(56) References Cited

U.S. PATENT DOCUMENTS

| | | |
|---|---|---|
| 2,071,012 | 2/1937 | Adams . |
| 2,376,834 | 5/1945 | Thompson . |
| 2,397,132 | 3/1946 | Dent, Jr. . |
| 2,638,990 | 5/1953 | Pitcairn . |
| 2,892,502 | 6/1959 | Donovan . |
| 3,262,658 | 7/1966 | Reilly . |
| 3,451,644 | 6/1969 | Marchetti et al. . |
| 3,509,971 | 5/1970 | Gerstine et al. . |
| 3,588,273 | 6/1971 | Kizilos . |
| 3,612,444 | 10/1971 | Girard . |
| 3,713,750 | 1/1973 | Williams . |
| 3,820,628 | 6/1974 | Hanson . |
| 3,954,229 | 5/1976 | Wilson . |
| 4,169,567 | 10/1979 | Tamura . |
| 4,514,143 | 4/1985 | Campbell . |

(List continued on next page.)

FOREIGN PATENT DOCUMENTS

1761973 * 9/1992 (SU) ................................... 416/90 R

*Primary Examiner*—Christopher Verdier
(74) *Attorney, Agent, or Firm*—Stout, Uxa, Buyan & Mullins, LLP; Donald E. Stout

(57) ABSTRACT

Porous surfaces on an aerodynamic structure driven with positive and negative pressures are used in an active control system for attenuating shock waves responsible for high-speed impulsive (HSI) noise. The control system includes an array of apertures in the outer skin of the structure providing fluid communication between the exterior flow stream and an interior volume of the structure. A movable diaphragm within the structure pushes air out of and pulls air in through the apertures under the action of a drive mechanism within the structure, thus creating oscillating air jets. The drive mechanism may be actuated by a controller based on information supplied by a sensor in the leading edge of the aerodynamic structure. The array of apertures may be spaced apart along the outer skin of the aerodynamic structure so as to span a distance of about 15% of the chord length. The oscillating airjets may be provided on multiple surfaces of the aerodynamic structure, including the upper and lower surfaces.

19 Claims, 12 Drawing Sheets

U.S. PATENT DOCUMENTS

| | | |
|---|---|---|
| 4,534,702 | 8/1985 | Johnson, Jr. et al. . |
| 4,580,210 | 4/1986 | Nordstrom . |
| 4,706,902 | 11/1987 | Destuynder et al. . |
| 4,799,859 | 1/1989 | Zimmer . |
| 4,802,642 * | 2/1989 | Mangiarotty ......................... 244/204 |
| 5,320,491 | 6/1994 | Coleman et al. . |
| 5,437,419 | 8/1995 | Schmitz . |
| 5,562,414 | 10/1996 | Azuma . |
| 5,588,800 * | 12/1996 | Charles et al. ......................... 416/24 |
| 5,806,808 * | 9/1998 | O'Neil ................. 244/208 |
| 5,938,404 * | 8/1999 | Domzalski et al. ................... 416/91 |
| 5,957,413 * | 9/1999 | Glezer et al. ......................... 244/208 |
| 6,092,990 * | 7/2000 | Hassan et al. ......................... 416/42 |

* cited by examiner

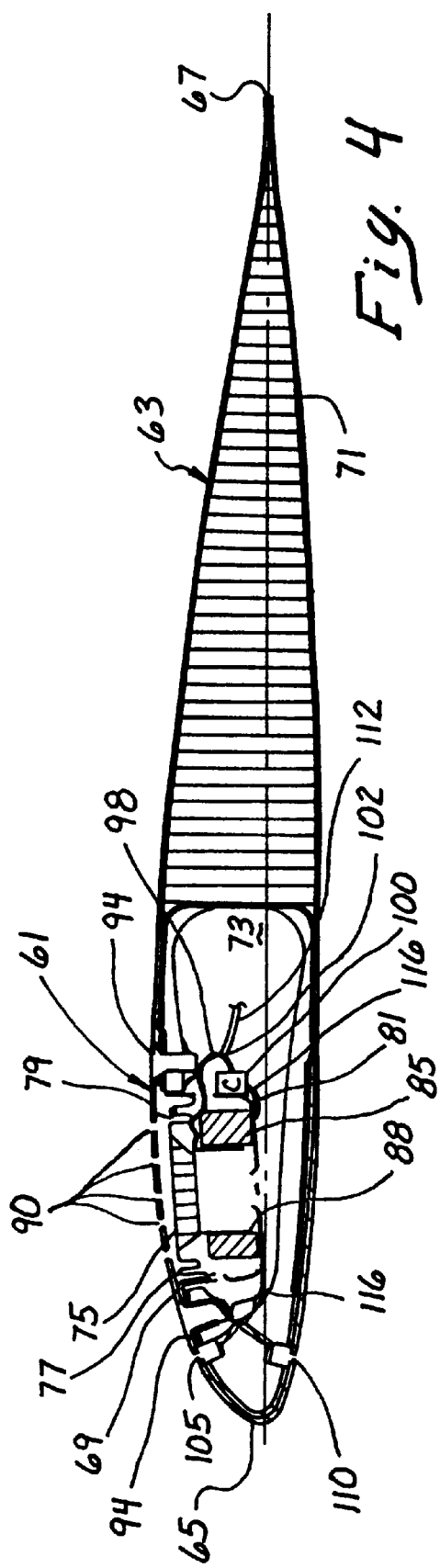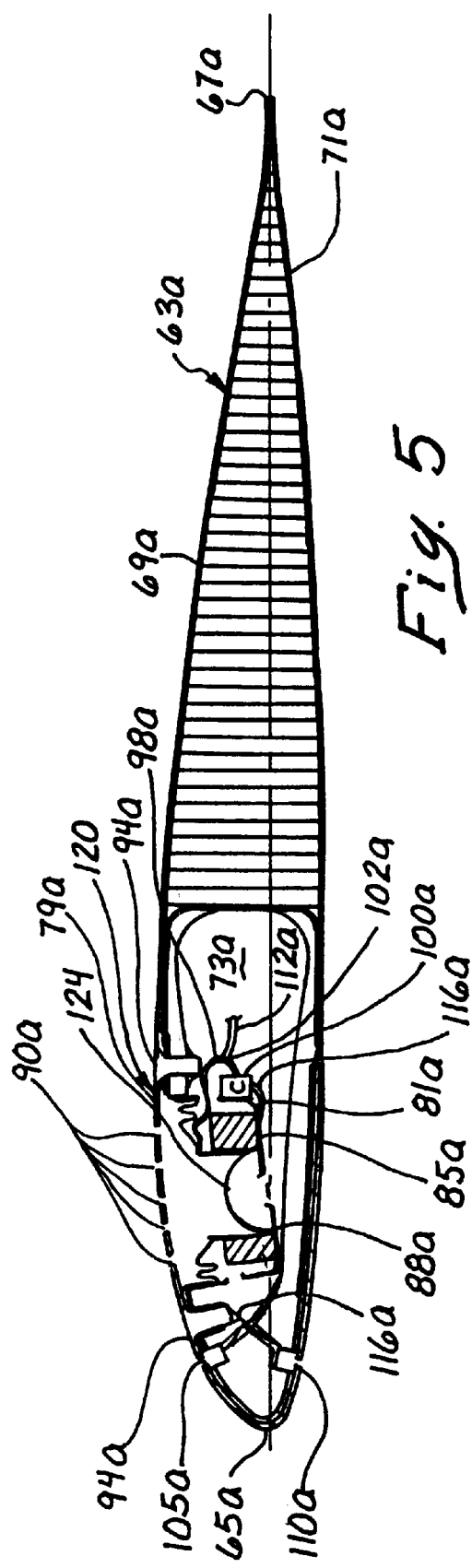

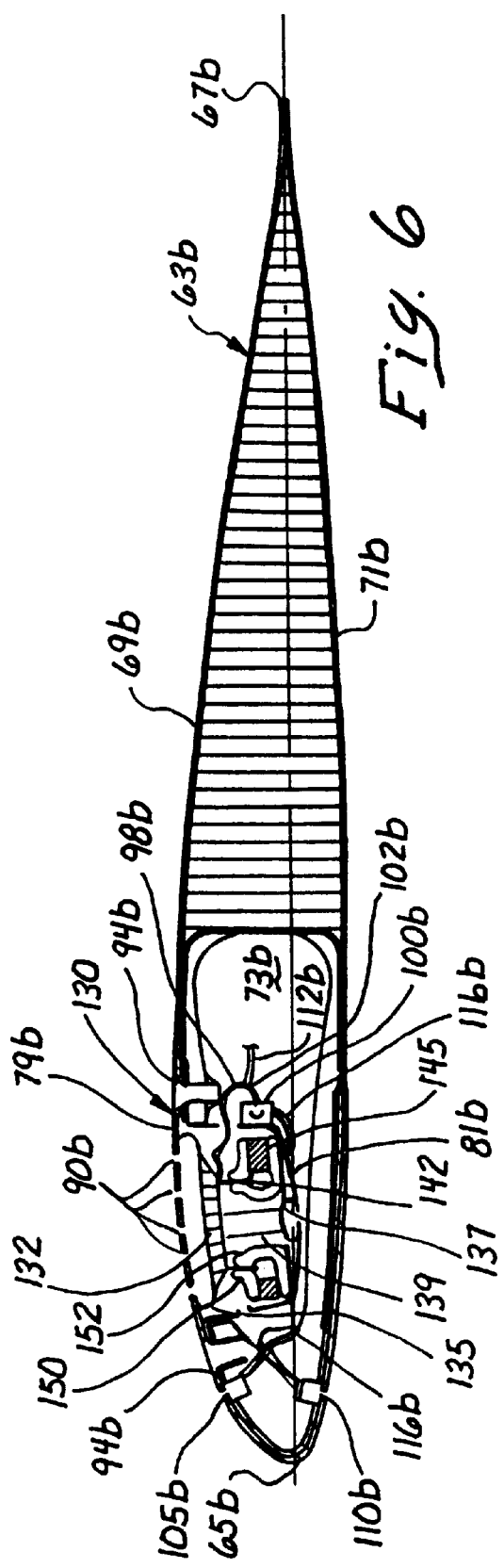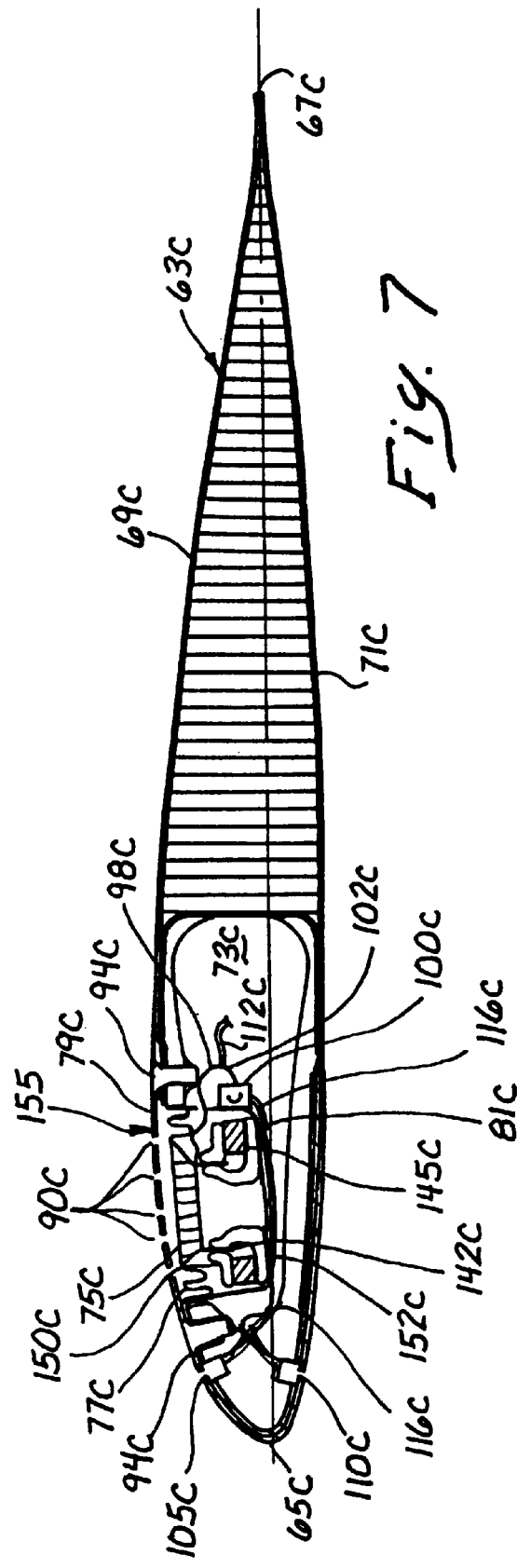

T= 0.0, Mp =1.1789

T= 0.1, Mp =1.1789

T= 0.2, Mp =1.1786

T= 0.3, Mp =1.1781

T= 0.4, Mp =1.1778

T= 0.5, Mp =1.1774

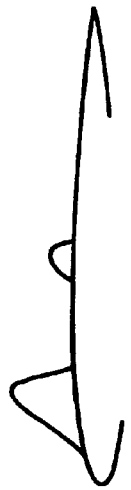
Fig. 21g
T=0.6, Mp=1.1772
Fig. 21h
T=0.7, Mp=1.1772
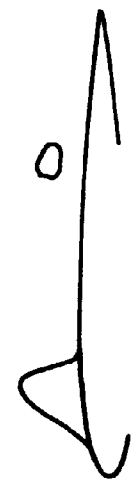
Fig. 21i
T=0.8, Mp=1.1773
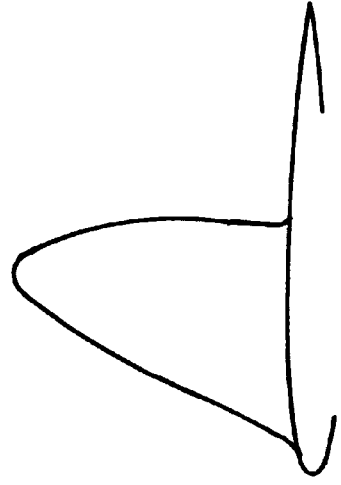
Fig. 21j
T=0.9, Mp=1.1813
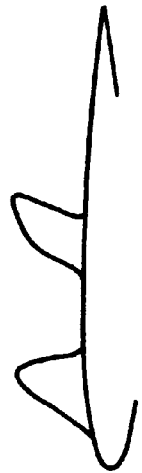
Fig. 21K
T=1.0, Mp=1.1789
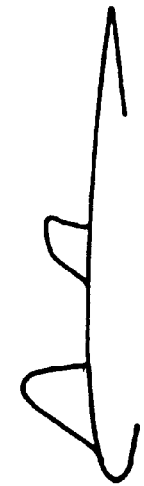
Fig. 21ℓ
Baseline, Mp=1.36

OSCILLATING AIR JETS FOR REDUCING HSI NOISE

This application claims the benefit of Provisional Application No. 60/071,140, entitled ZERO-MASS AIR JETS FOR CONTROL AND BVI NOISE REDUCTION, filed Jan. 12, 1998; and Provisional Application No. 60/071,142, entitled REDUCING SHOCK WAVE STRENGTH/HSI NOISE USING ZERO-MASS JETS, filed Jan. 12, 1998; the contents of which are expressly incorporated herein by reference.

This application is a continuation-in-part of co-pending U.S. application Ser. No. 08/869,725, filed on Jun. 5, 1997 and entitled OSCILLATING AIR JETS FOR HELICOPTER ROTOR AERODYNAMIC CONTROL AND BVI/NOISE REDUCTION; and U.S. patent application Ser. No. 08/869,372 filed on Jun. 5, 1997, now U.S. Pat. No. 5,938,404, and entitled OSCILLATING AIR JETS ON AERODYNAMIC SURFACES; both of which are commonly assigned and the contents of which are expressly incorporated herein by reference.

This application is related to U.S. application Ser. No. 08/251,329, filed on May 31, 1994 and entitled BLADE VORTEX INTERACTION NOISE REDUCTION TECHNIQUES FOR A ROTORCRAFT, which issued into U.S. Pat. No. 5,588,800; U.S. Pat. No. 5,813,625, filed on Oct. 9, 1996 and entitled ACTIVE BLOWING SYSTEM FOR ROTORCRAFT VORTEX INTERACTION NOISE REDUCTION; both of which are commonly assigned and the contents of which are expressly incorporated herein by reference.

BACKGROUND OF THE INVENTION

1. Field of the Invention

This invention relates generally to aerodynamic surfaces and, more particularly, to improved constructions and control schemes for such aerodynamic surfaces which provide for aerodynamic control and for significant reductions in noise in the case of rotor blades.

2. Description of Related Art

Commercial and military helicopters/tiltrotors in hover and in high-speed forward (or edgewise) flight generate an impulsive noise signature which is commonly referred to as high-speed impulsive (HSI) noise. Three factors are known to affect the intensity of HSI noise. First, the strength of the shock wave(s) terminating the local pocket(s) of the supersonic flow on the blade affects the HSI noise. The unsteady chordwise motion of the shock wave as a function of blade azimuth also affects the HSI noise. The third factor contributing to HSI noise is the local airfoil geometry, such as the maximum thickness and camber constituting the tip of the rotor blade. The local airfoil geometry is known to effect the chordwise extent of the local pockets of supersonic flow. One or more of the above factors can be altered using an active or passive noise control technique in order to reduce or eliminate HSI noise.

In forward flight, HSI noise is typically generated at high advance ratios predominantly from the advancing rotor blades where local region(s) or pockets of supersonic flow are most likely to occur. At high advance ratios, the supersonic flow regions are usually terminated by strong shock waves having strengths that are proportional to the static pressure rises across the shock waves or, alternatively, to the peak local Mach numbers ahead of the shock waves. In forward flight, the strengths of the shock waves and the chordwise extents of the supersonic flow pockets vary with the azimuthal positions of the rotor blade due to the variations in the local free stream Mach numbers. At much higher advance ratios, the local pockets of supersonic flow, now associated with stronger shock waves on the rotor blade, extend beyond the tip of the blade sometimes exceeding what is commonly defined as the "sonic" cylinder. Beyond the radius which defines the sonic cylinder, the flow is entirely supersonic. At these conditions, the flow on the rotor blade is referred to as being delocalized.

In hover, HSI noise can also occur as a result of a number of factors including a high rotational tip Mach number, a combination of a moderate tip Mach number and a relatively thick blade tip airfoil section, and a combination of a moderate tip Mach number, a relatively thin blade tip airfoil and high tip twist.

Regardless of the mode of operation, once strong shock waves have formed, HSI noise can severely impact the operation of both military and, to a lesser extent, commercial rotorcraft. This noise source is especially important for military operations, since it is known to be responsible for aircraft detection. A reduction in the intensity of HSI noise and/or the manipulation, using active or passive control techniques, of the resulting noise signature, is needed.

No active noise control techniques are known for reducing the strength of the shock waves responsible for HSI noise. Conventional methods for reducing HSI noise rely predominantly on passive, indirect approaches, which demand the highest possible drag divergence Mach number and the minimum allowable thickness for the rotor blade tip airfoil. Conventional methods, although partially effective, do not guarantee low HSI noise levels at operation conditions other than the specifically designed and engineered operation condition.

SUMMARY OF THE INVENTION

This invention addresses the aforementioned problems by providing an active control device which has a number of advantages over prior art solutions. A porous surface on an aircraft structure driven with oscillating positive and negative pressures is used as an active control device for attenuating negative aerodynamic interactions. The porous surfaces can be driven with positive and negative pressures either continuously or when predetermined flight conditions are present. The porous surface can be used on rotor blades to reduce HSI noise in hover and forward flight conditions. The porous surface of the present invention facilitates active noise control techniques for altering the strength of the shock wave(s) and the chordwise extent of the pockets of supersonic flow associated with HSI noise.

The present invention, together with additional features and advantages thereof, may best be understood by reference to the following description taken in connection with the accompanying illustrative drawings.

BRIEF DESCRIPTION OF THE DRAWINGS

FIG. 4 is a cross-sectional view of a rotor blade having an oscillating air jet assembly disposed therein in accordance with a first embodiment of the present invention;

FIG. 5 is a cross-sectional view of a rotor blade having an oscillating air jet assembly disposed therein in accordance with a second embodiment of the present invention;

FIG. 6 is a cross-sectional view of a rotor blade having an oscillating air jet assembly disposed therein in accordance with a third embodiment of the present invention;

FIG. 7 is a cross-sectional view of a rotor blade having an oscillating air jet assembly disposed therein in accordance with a fourth embodiment of the present invention;

FIGS. 21a–l are schematic representations of predicted supersonic flow pockets on an upper surface of a rotor blade (airfoil) at different times and under different operating environments employing the oscillating air jets.

DETAILED DESCRIPTION OF THE PRESENTLY PREFERRED EMBODIMENTS

Figure 1:
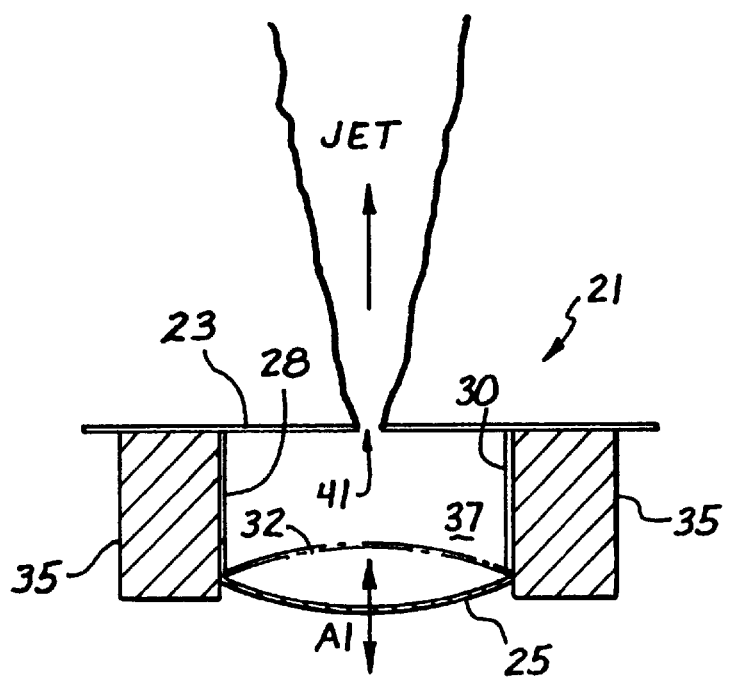
FIG. 1 is a cross-sectional view of an oscillating air jet assembly comprising a piezoelectric membrane in accordance with the present invention.

Referring now more particularly to the drawings, FIG. 1 illustrates an oscillating air jet assembly 21 which is disposed on an aerodynamic surface 23. The oscillating airjet 21 comprises a diaphragm 25 formed of a piezoelectric material. The diaphragm 25 is preferably supported between a first conductor 28 and a second conductor 30, and is movable in the directions of the arrows A1 between a first position indicated by the reference numeral 25 and a second position indicated by the phantom lines 32.

A chassis 35 secures the first conductor 28 and the second conductor 30 to the aerodynamic surface 23. An oscillating current is provided to the diaphragm 25 via the first conductor 28 and the second conductor 30, to thereby electrically stimulate the diaphragm 25 to oscillate in directions of the arrows A1.

Movement of the diaphragm from a first position 25 to a position 32 shown in phantom produces a positive pressure within the sealed chamber 37, and movement of the diaphragm in the opposite direction produces a negative pressure in the sealed chamber 37. An aperture 41 is formed in the aerodynamic surface 23 to facilitate movement of air out of and into the sealed chamber 37, in response to the positive and negative pressures generated within the sealed chamber 37 by the diaphragm 25.

When the diaphragm 25 moves in a direction toward the aerodynamic surface 23 a positive pressure is produced within the sealed chamber 37, resulting in a flow of air out of the aperture 41. Similarly, when the diaphragm 25 moves away from the aerodynamic surface 23 a negative pressure within the sealed chamber 37 is established and, consequently, air is drawn into the sealed chamber 37 through the aperture 41.

The resulting oscillation of air into and out of the sealed chamber 37 through the aperture 41, as a result of the oscillating diaphragm 25, is referred to as a zero-mass jet or, alternatively, as an oscillating air jet assembly. The zero-mass jet of FIG. 1 preferably comprises a net mass of air flow into and out of the aperture 41 which is equal to zero during one complete cycle of oscillation of the diaphragm 25.

Figure 2:
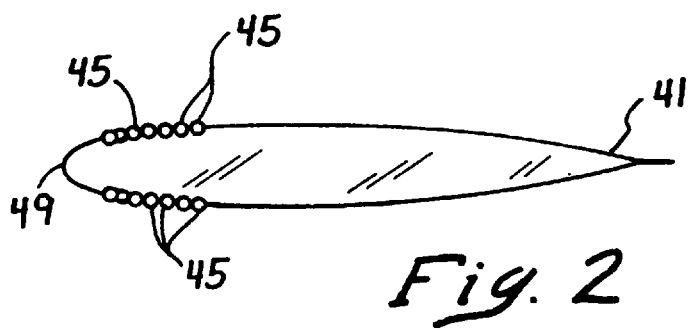
FIG. 2 is a schematic cross-sectional view of a rotor blade having a plurality of oscillating air jet assemblies near a leading edge thereof.
Figure 3:
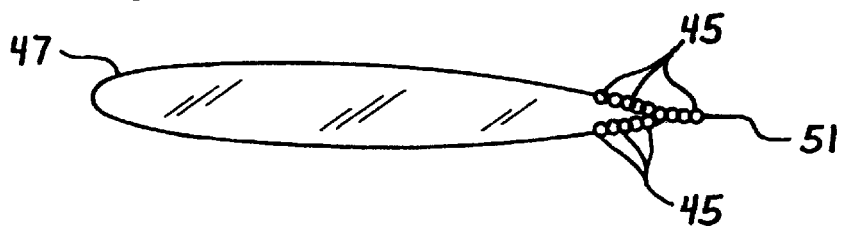
FIG. 3 is a schematic cross-sectional view of a rotor blade having a plurality of oscillating air jet assemblies near a trailing edge thereof.

With reference to FIGS. 2 and 3, arrays of oscillating airjet assemblies 45 can be placed on a rotor blade 47 (cross-section shown) in a variety of different locations. The cross-sectional view of FIG. 2 illustrates a plurality of oscillating air jet assemblies 45 disposed on an upper surface of the rotor blade near a leading edge 49. An additional array of oscillating air jet assemblies 45 is disposed on a bottom surface of the rotor blade 47 near the leading edge 49.

FIG. 3 illustrates an array of oscillating airjet assemblies 45 disposed on an upper surface of the rotor blade 47 near a trailing edge 51 of the rotor blade 47, and further illustrates an array of oscillating air jet assemblies 45 on a bottom surface near the trailing edge 51 of the rotor blade 47. The oscillating air jet assemblies 45 of FIG. 2 may be disposed on only one of the two surfaces of the rotor blade 47 in alternative embodiments. Similarly, either or both of the arrays of oscillating airjet assemblies 45 may be disposed near the trailing edge 51 of the rotor blade 47.

Placement of the oscillating airjet assemblies 45 on either the upper, the lower, or both surfaces of the rotor blade 47 results in substantial changes to the original aerodynamic characteristics of the rotor blade 47. Similar effects are achieved by placing the oscillating air jet assemblies 45 on other aerodynamic structures, such as wings, airplane/helicopter fuselages, engine inlets, engine exhausts, blunt surfaces, and nozzles, for example. In the illustrated embodiment of FIG. 2, the oscillating air jet assemblies 45 are centered about the 15 percent rotor blade chord position. In the embodiment of FIG. 3, the oscillating air jet assemblies 45 are placed near the trailing edge 51 of the rotor blade 47 to emulate aerodynamic effects resulting from use of a mechanical integral-type flap.

The oscillating airjet assemblies 45 may comprise oscillating diaphragms, such as disclosed in FIG. 1 or, alternatively, may comprise other means, such as electromagnetic, for generating an oscillating airjet, such as disclosed in FIGS. 4–7, for example. The oscillating air jet assemblies of the present invention are primarily adapted for targeting local blade aerodynamics (blade geometry) rather than the vortex strength or the blade-vortex separation distance, for alleviation of helicopter rotor blade-vortex interactions BVI. Other uses and effects, however, are also contemplated by the present invention in connection with the use of rotor blades and other aerodynamic surfaces.

FIG. 4 is a cross-section view illustrating an oscillating air jet assembly 61 installed within a rotor blade 63. The rotor blade 63 comprises a leading edge 65, a trailing edge 67, an upper surface 69, a lower surface 71, and an interior volume 73. The oscillating air jet assembly 61 generally comprises a piston 75, a diaphragm 77, an aerodynamic surface 79, a chassis 81, a magnet 85, and a voice coil 88. A plurality of apertures 90 are disposed in the aerodynamic surface 79. The oscillating air jet assembly 61 preferably comprises a single unit which can be secured into a recess in the upper surface 69 via mounting apertures 94. Screws or bolts may be inserted into the mounting apertures 94 and secured into a frame of the rotor blade 63, to thereby secure the oscillating air jet assembly 61 within the interior volume 73 of the rotor blade 63.

The piston 75 is secured by a preferably flexible diaphragm 77 to an underside of the aerodynamic surface 79 by means such as an adhesive, for example. The diaphragm 77 holds the piston 75 in close proximity to the plurality of apertures 90, and also holds the piston 75 in an orientation to place the voice coil 88 in close proximity to the magnet 85. The piston 75 preferably comprises a strong and lightweight material, such as an aluminum honeycomb or other composite material. The diaphragm 77 preferably comprises a flexible material having both a resilient characteristic and a memory characteristic. As presently embodied, the flexible diaphragm comprises silicone rubber with a fiberglass reinforcement material added thereto. The diaphragm 77 preferably creates a sealed chamber between the piston 75 and the plurality of apertures 90 on the aerodynamic surface 79.

The voice coil 88 preferably comprises a cylindrical structure which is attached to a bottom surface of the piston 75. The piston 75 is also cylindrically shaped. A single wire is wound around a cylindrical wall, or a rectangular box-like wall, to thereby form the voice coil 88. The wire is routed from the voice coil 88 to a conductor path 98. As presently embodied, the magnet 85 comprises a rare-earth material for providing a fixed magnetic field. Other means for providing a fixed magnetic field, however, may be used as is known in the art. For example, a single-wire winding may be used. The magnet 85 is preferably ring-shaped, to thereby accommodate the voice coil 88 therein. In modified embodiments, the magnet 85 comprises one or more rods having a rectangular cross-section(s).

An oscillating signal is fed from the conductor path 98 to the voice coil 88 to thereby generate an oscillating magnetic field, which when coupled with the fixed magnetic field from the magnet 85, produces electrodynamic forces for moving the piston 75. Movement of the piston 75 in a direction toward the plurality of apertures 90 forces air out through the aerodynamic surface 79. Similarly, movement of the piston 75 in a direction away from the apertures 90 draws air through the plurality of apertures 90 and into the aerodynamic surface 79.

As an alternative embodiment to the circular piston 75, voice coil 88, and magnet 85, other elliptical shapes may be implemented. According to one alterative embodiment, an oval shape or a rectangular shape may be used for the piston 75, the magnet 85, and the voice coil 88. The oval shapes of the elements 75, 85, 88 can extend along a length of the rotor blade 63 to provide a perhaps more advantageous configuration. An oval shape is contemplated to provide specific stability features which may be suitable for various specific acceleration forces which are experienced at different points along a rotating rotor blade.

The voice coil 88 may be energized via the conductor path 98 continuously or according to predefined parameters. A controller 100 can issue signals to the conductor path 98 via a juncture 102, for example. As discussed below with reference to FIGS. 9–16, the controller 100 can receive and process information from an upper pressure sensor 105, a lower pressure sensor 110, a microprocessor (not shown), or by other means such as a user input via the other conductive path 112.

Electrical signals can also be supplied to the conductive path 98 via another conductive path 112 which may be responsive to user inputs, for example. Power is supplied to the oscillating air jet assembly 61 via the other conductive path 112 or, alternatively, a local power source such as a battery (not shown) may be implemented. A conductive path 116 connects the controller 100 to the upper pressure sensor 105 and the lower pressure sensor 110, as presently embodied. In alternative embodiments where the piston 75 is driven continuously or where the piston 75 is driven from a source other than the controller 100, the controller 100 may be eliminated. Alternatively, the controller 100 may be positioned in other locations, such as a location outside of the rotor blade 63.

Figure 8:
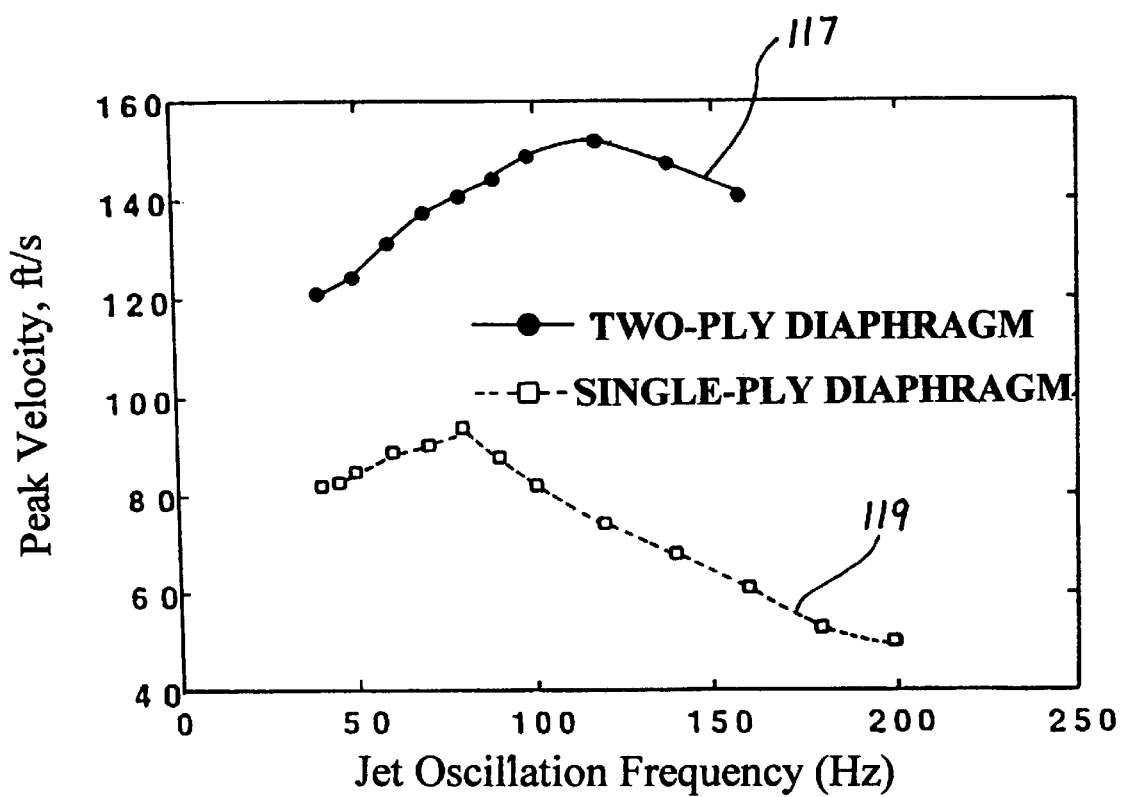
FIG. 8 illustrates the measured peak jet velocity as a function of jet oscillation frequency for two different stiffnesses of silicon rubber "bellows" of an oscillating air jet assembly.

The single-wire winding disposed around the cylindrical wall, which is attached to the piston 75, is referred to herein as a voice coil 88 for illustrative purposes only. Voice coils of loud speakers, for example, comprise differently proportioned elements which are adapted to perform different functions than the elements of the oscillating airjet assembly 61. The voice coil 88 and piston 75 are configured, for example, to produce pressures which are on an order of magnitude greater than pressures produced by prior art loud speakers. Loud speakers, for example, do not typically comprise pistons 75 formed of lightweight, rigid materials. The plot illustrated in FIG. 8 shows peak velocity versus jet oscillation frequency, for diaphragms 25 of different stiffnesses. The plot 117 corresponding to a two-ply diaphragm 25 provides a larger peak velocity through the aperture 41, compared to the plot 119 corresponding to a single-ply diaphragm 25.

Additionally, a ratio of the voice coil 88 diameter to the piston 75 diameter is relatively small, compared to ratios of typical voice coil speaker systems. This ratio of the voice coil 88 diameter to the piston 75 diameter is preferably less than or equal to about one half and, in the illustrated embodiment, is equal to about 0.67.

The piston 75 is adapted to oscillate at relatively low frequencies, compared to piezoelectric diaphragms, such as the diaphragm 25 illustrated in FIG. 1. The relatively small volume of air between the piston 75 and the plurality of apertures 90 provides the oscillating air jet assembly 61 with a relatively large compression ratio, which is sufficient to generate relatively high velocities of air through the plurality of apertures 90. The spring rate and moving mass of the piston 75 and diaphragm 77 may be tuned to allow for an operation which is always at the system's natural frequency to further enhance efficiency. When utilized in a helicopter blade, for example, the mass of the oscillating airjet assembly 61 maybe located at a forward location of the normal center of mass of the rotor blade 63. Consequently, the oscillating air jet assembly 61 may be substituted for the tip and/or leading edge weight which is typically present in a rotor blade.

FIGS. 5–7 disclose other oscillating air jet assembly embodiments. The discussion of FIG. 4 applies in large part to the discussion below with reference to FIGS. 5–7. The oscillating air jet assemblies of FIGS. 4–7 can be implemented in virtually any rotor blade and on other aerodynamic structures, such as wings, engine inlets, engine exhausts, blunt surfaces, and nozzles, for example. The oscillating air jet assemblies of FIGS. 4–7 can additionally be constructed for use in fixed wing applications including engine inlets (for stall alleviation) and exhaust (for vectoring). The oscillating air jet assemblies of the present invention, including the device disclosed in FIG. 1, can further be used in non-aircraft applications and with other fluids in addition to air, in addition to the above-described applications of the invention. Similarly to the embodiment of FIG. 4, the oscillating air jet assemblies of FIGS. 5–7 are configured to output relatively high energy levels, compared to the embodiment of FIG. 1. All of the oscillating air jet assemblies of the present invention provide benefits including reduced mechanical complexity, reduced compromise of structural integrity, relatively simple manufacturing, reduced aerodynamic drag, reduced air-source power requirements, greater flexibility in placement and less impact on structure, and reduced radar detectability relative to the sharp edges, gaps, and angles formed by conventional aerodynamic control surfaces or Coanda slots, for example.

In the embodiment of FIG. 5, like elements are designated with like reference numerals followed by the letter "a." The oscillating airjet assembly 120 comprises a voice coil 88a connected between a diaphragm 77a and a cone 124. The cone 124 may comprise a nickel electroform material, for example, and the diaphragm 77a is preferably constructed of a material suitable for holding and aligning the cone 124 within the magnet 85a.

In FIGS. 4–7, only a single oscillating airjet assembly is illustrated. Should a second oscillating air jet assembly be required for placement on the lower surface of the rotor blade, a second oscillating air jet assembly may be placed aft of the first oscillating air jet assembly. In FIG. 5, the first oscillating air jet assembly 120 extends between the 12.5 percent and the 22.5 percent blade chord positions. A second oscillating air jet assembly may be placed between the 22.5 percent and the 32.5 percent blade chord positions. Also, in the embodiments of FIGS. 4–7, the pressure sensors 105, 110 are disposed at the 5 percent blade chord position.

FIG. 6 illustrates an oscillating airjet assembly 130 in accordance with the present invention. A piston 132, which preferably comprises an aluminum honeycomb material, is held in place by a first diaphragm 135 and a second diaphragm 137. Both the first diaphragm 135 and the second diaphragm 137 preferably comprise a silicone rubber having a fiberglass reinforcement. A connecting member 139, which preferably comprises aluminum, connects the piston 132 to the second diaphragm 137.

The combination of the first diaphragm 135 and the second diaphragm 137 provides sufficient strength, flexibility, and memory to properly align the voice coil 142 within the gaps of the magnet 145 during the dynamic operation of the rotor blade 63b. The fabrication of the connecting member 139 of aluminum provides for heat dissipation, to thereby dissipate heat generated by the voice coil 142, for example.

A sealed volume of air between the piston 132 and the plurality of apertures 90b is relatively small in the embodiment of FIG. 6, facilitating the generation of high jet pressures by the piston 132. In the embodiment of FIG. 6, for example, a first core 150 and a second core 152 are coupled to the magnet 145, to channel the magnetic flux from the magnet 145 to the voice coil 142. The first core 150 and the second core 152 form a gap, which accommodates the voice coil 142 therein. The first core 150 and the second core 152 help to align the voice coil 142, and further help to stabilize the voice coil 142 and prevent the voice coil 142 from contacting and rubbing against the cores 150, 152.

FIG. 7 illustrates another embodiment of the present invention. In the embodiment of FIG. 7, like elements are denoted with like numerals, followed by the letter "c." The oscillating airjet assembly 155 of FIG. 7 generally comprises a piston 75c and a diaphragm 77c, both of which are similar to the piston 75 and the diaphragm 77 of FIG. 4. The oscillating air jet assembly 155 of FIG. 7 further comprises a voice coil 142c, a magnet 145c, a first core 150c, and a second core 152c, which are similar to the elements 142, 145, 150, and 152, respectively, of FIG. 6. As with the other illustrated embodiments, the chassis 81c is aluminum super plastic formed and the aerodynamic surface 79c comprises nickel hydroform.

FIGS. 9–16 illustrate results obtained from computational fluid dynamics simulations of air flow over an exemplary rotor blade having oscillating air jet assemblies disposed on upper and lower surfaces thereof, between the 0.13 and 0.23 airfoil chord positions. The simulated rotor blade section comprises a symmetric NACA-0012 airfoil. The simulations were performed using a free-stream Mach number (vn) of 0.6 and an angle of attack (Alfa) of 0 degrees. In the simulations of FIGS. 9, 11, 12, and 14, a peak jet velocity (vn) of 0.20 was used. A peak jet velocity (vn) of 0.05 was used for the simulations of FIGS. 15 and 16. Also, peak jet velocities of 0.05, 0.10, and 0.20 were used in the simulations of FIGS. 10 and 13.

Figure 9:
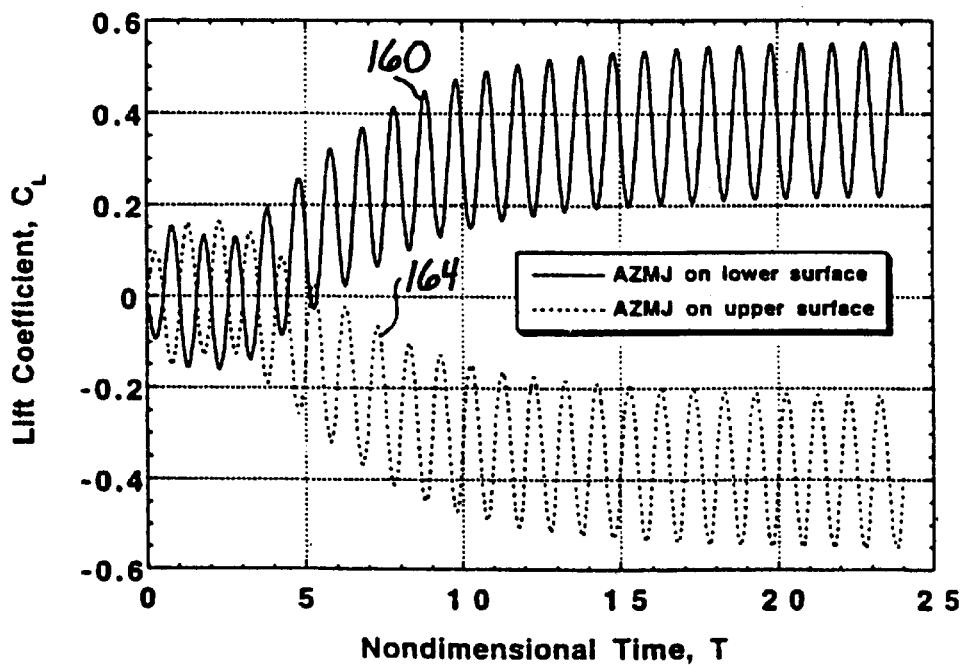
FIGS. 9–16 illustrate results obtained from computational fluid dynamics simulations of air flow past rotor blades incorporating various oscillating air jet assemblies in accordance with the present invention.

FIG. 9 illustrates a plot of lift coefficient versus non-dimensional time for an oscillating air jet assembly. An array of zero mass jets (AZMJ) is disposed on an upper surface of the simulated airfoil and on a lower surface of the simulated airfoil. The line 160 represents the results of a simulation for an AZMJ placed on a lower surface of an airfoil, and the line 164 represents a plot of the results of a simulation of an AZMJ placed on an upper surface of an airfoil. The jet oscillation frequency (f) was equal to 1585 Hz in both simulations. FIG. 9 indicates that the activation of the lower surface AZMJ results in a net increase in the mean sectional lift. This result is similar to a simulation obtained from a trailing-edge flap down condition of an airfoil. Activation of the upper surface AZMJ results in a decrease in the sectional lift, which corresponds to a deployed trailing-edge flap up condition. The results of the simulations of FIG. 9 suggest that, when operated independently, the AZMJ systems can emulate substantially the same aerodynamic effects, in a mean sense, which are produced using a mechanical trailing-edge flap. The unsteady aerodynamic effects which result from a harmonically moving trailing-edge flap can thus be emulated, again in a mean sense, by repetitively activating and deactivating the upper and lower surface AZMJ systems.

Figure 10:
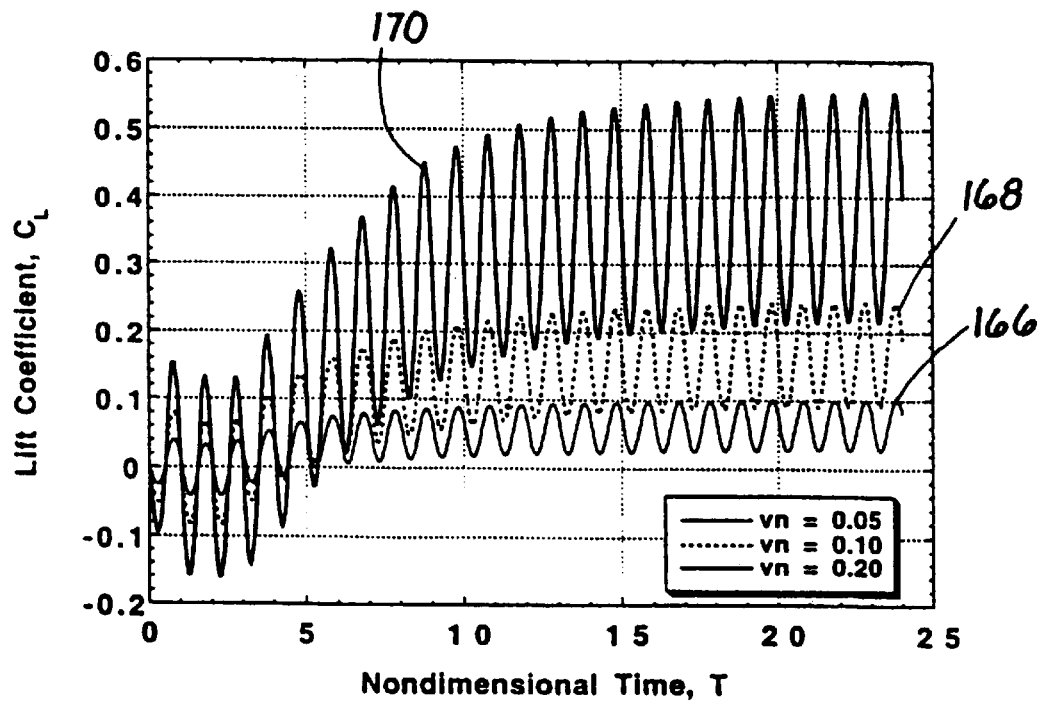

FIG. 10 illustrates several simulations of an active lower surface AZMJ using various peak jet velocities (vn). The term peak jet velocity refers to a peak velocity of air measured outside of the aperture 41 of FIG. 1 divided by the free stream speed of sound. The first plot 166 corresponds to a simulation using a peakjet velocity of 0.05, and the second plot 168 corresponds to a simulation using a peak jet velocity of 0.10. The third plot 170 corresponds to a simulation using a peak jet velocity of 0.20. A jet oscillation frequency of 1585 Hz was used for each of the plots 166, 168, and 170. FIG. 10 indicates a direct relationship between jet peak velocity and the attainable mean lift value. The higher jet peak velocity of 0.20 generated a higher lift coefficient, as indicated by the plot 170.

Figure 11:
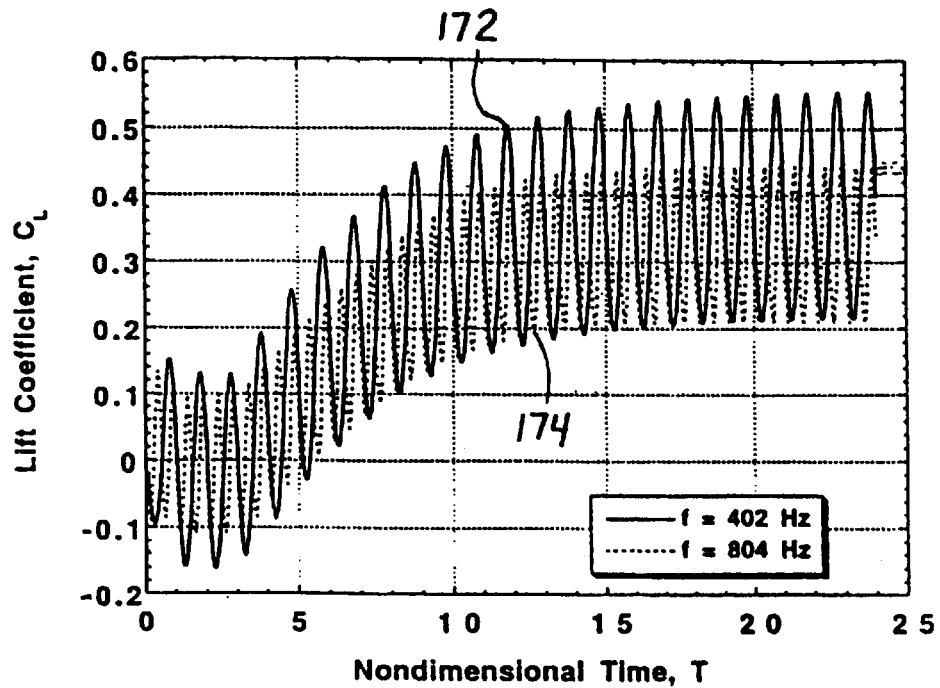

FIG. 11 illustrates a plot of lift coefficient versus non-dimensional time for simulations using two different oscillation frequencies. The plot 172 corresponds to a simulation using a jet oscillation frequency of 1585 Hz, and the plot 174 corresponds to a simulation using a jet oscillation frequency of 3170 Hz. The results of FIG. 11 indicate that higher oscillation frequencies are associated with lower mean sectional lift values. These results also suggest that the jet oscillation frequency can be used as an alternative parameter to the jet peak velocity for controlling the attainable mean sectional lift values.

Figure 12:
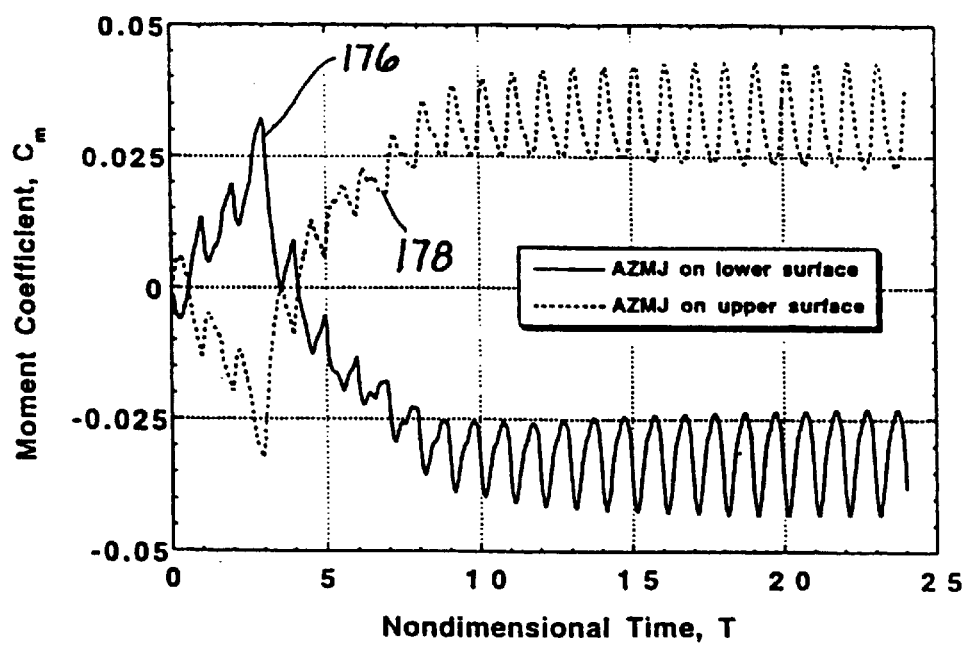

FIG. 12 illustrates a plot of moment coefficient versus non-dimensional time for simulations incorporating an AZMJ on a lower surface and an AZMJ on an upper surface of an airfoil. The plot 176 corresponds to a simulation of an AZMJ system on a lower surface of an airfoil, and the plot 178 corresponds to a simulation of an AZMJ device on an upper surface of an airfoil. A jet oscillation frequency of 1585 Hz was used for both simulations. FIG. 12 indicates that the activation of the lower surface AZMJ system results in a negative pitching moment (nose down), which effect is similar to that obtained by deploying a trailing-edge flap down. The activation of the upper surface AZMJ results in a positive pitching moment (nose up), which effect is similar to that obtained by deploying a trailing-edge flap up. The results of FIGS. 9 and 12 suggest that, when operated independently, the AZMJ systems can emulate similar aerodynamic effects, in a mean sense, to those produced using a mechanical trailing-edge flap.

Figure 13:
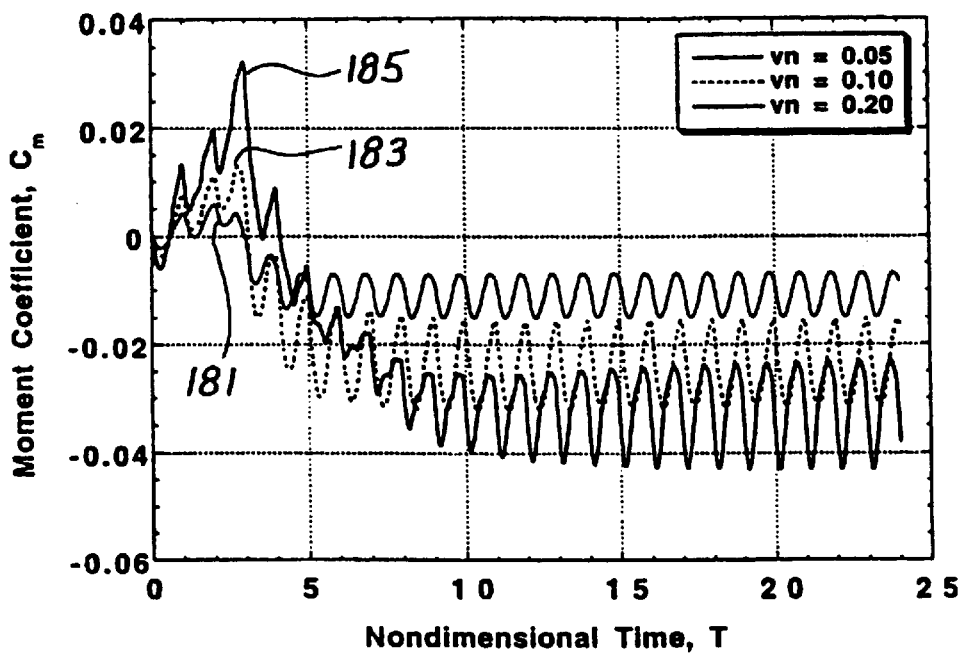
Figure 14:
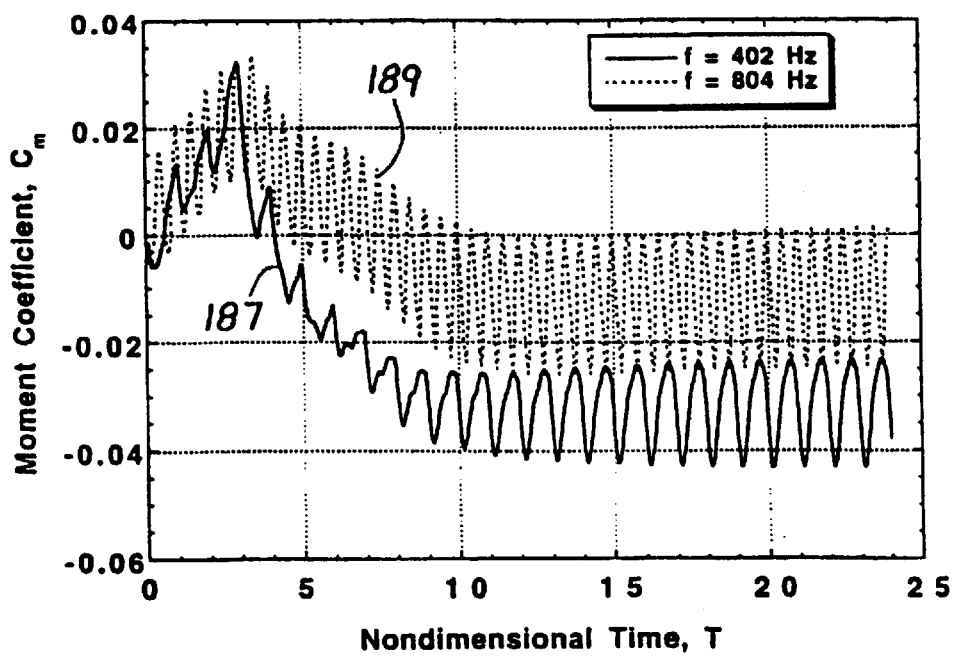

FIGS. 13 and 14 are plots of non-dimensional time versus pitching (or quarter chord) moment coefficient for various simulations. The simulations of FIG. 13 vary the peak jet velocities, and the simulations of FIG. 14 vary the jet oscillation frequencies. The simulations of both FIG. 13 and FIG. 14 were conducted for active lower surface AZMJ systems. The plot 181 in FIG. 13 corresponds to a simulation using a peak jet velocity of 0.05, and the plot 183 corresponds to a using a peak jet velocity of 0.20. FIG. 13 indicates a direct relationship between the peak jet velocity and levels of the attainable pitching moment values. As the jet peak velocity is increased, the levels of the attainable pitching moment values are likewise increased.

FIG. 14 illustrates a first plot 187 of pitching moment coefficient versus non-dimensional time, corresponding to a jet oscillation frequency of 1585 Hz. The plot 189 corresponds to a simulation using a jet oscillation frequency of 3170 Hz. The plots of FIG. 14 indicate that the jet oscillation frequency can also be used, in addition to the peak jet velocity, as a means for altering the attainable mean pitching moment values.

The controller 100 of FIGS. 4–7 can be used to instruct the piston 75, or the cone 124 to oscillate with various intensities and frequencies. Additionally, the controller 100 can instruct a lower piston (not shown) to oscillate with various intensities and frequencies, according to the present invention. Instructions to vary the parameters of operation of upper and lower pistons can be generated by a microprocessor (not shown), by the sensors 105, 110, or by other means such as a user input via the other conductive path 112. The instructions may alternatively originate within the controller 100.

A piston on a lower surface of an airfoil can be oscillated to increase an amount of lift generated by the rotor blade, in response to an instruction to the controller to either increase the lift or to generate a negative pitching moment (nose down) on the rotor blade. A piston disposed on the upper surface of an airfoil can be oscillated to decrease an effective amount of lift generated by the rotor blade, in response to an instruction to decrease an amount of lift or to generate a positive pitching moment (nose up). Additionally, a piston on the upper surface of an airfoil may be oscillated at a higher frequency to effectively increase an amount of lift of the rotor blade, and may be oscillated at a lower frequency to effectively decrease an amount of lift generated by the rotor blade. A similar situation applies for a piston disposed on a lower surface of an airfoil, where greater frequencies reduce lift and smaller frequencies increase lift. Instructions may be input into the controller 100 to change the lift generated by the rotor blade and/or the pitching moment generated by the rotor blade, by varying the frequency of one or more pistons.

Additionally, a piston on an upper surface of an airfoil may be oscillated at a greater energization level to effectively decrease the lift of the rotor blade, and may be oscillated at an effectively lower energization level to effectively increase the lift of the rotor blade. A piston disposed on a lower surface of an airfoil may be oscillated at a greater energization level to generate greater lift, and may be oscillated at a lower energization level to decrease lift. Instructions may be input into the controller 100 to affect different amounts of lift and/or pitching moments by changing the energization level of the piston or cone.

Figure 15:
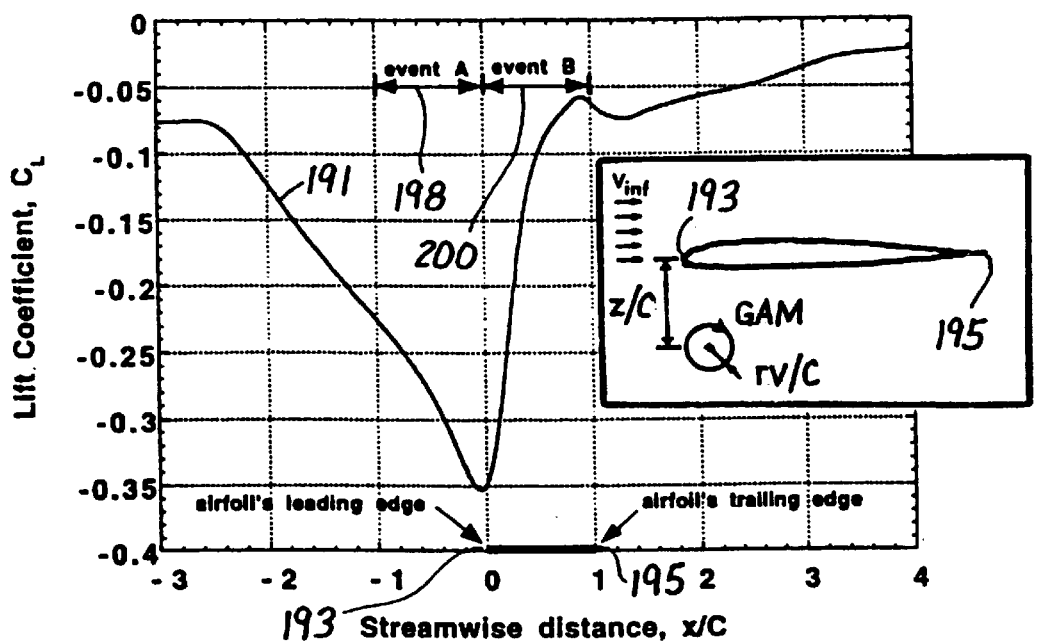

FIG. 15 is a plot of lift coefficient versus stream-wise distance. The plot 191 illustrates a simulated temporal variation of the sectional lift for the NACA-0012 airfoil during parallel interaction with a vortex of strength (GAM), equal to 0.20, having a core radius (rv) equal to 0.25 C (where C is the chord length of the airfoil), and located at a miss distance (Zv) equal to minus 0.25 C. The airfoil experiences a continuous decrease in its sectional lift values as the clockwise vortex approaches the leading edge of the airfoil, as indicated in FIG. 15. Once the vortex passes beyond the leading edge of the airfoil, there is a rapid increase in the airfoil's sectional lift values. The rapid increase continues and eventually levels off as the vortex moves further downstream of the airfoil's trailing edge. In the absence of the simulated vortex of FIG. 15, the airfoil's sectional lift value would be equal to zero by virtue of the airfoil's geometric symmetry.

The oscillating air jet assemblies of the present invention can be synchronized together by the controller 100 (FIGS. 4–7, for example) to attenuate the aerodynamics which contribute to BVI. The temporal LIFT distribution of FIG. 15 is partitioned into Event A indicated by the reference numeral 198 and an Event B indicated by the reference numeral 200. Event A is associated with the observed decrease in the sectional lift which takes place as the vortex approaches the airfoil's leading edge 193, and Event B is associated with the observed rapid increases in the sectional lift as the vortex passes and continues to move downstream beyond the airfoil's leading edge 193. An oscillating air jet assembly is provided on the lower surface of the airfoil in order to reduce the rate at which the sectional lift is decreasing. The oscillating air jet assembly on the lower surface of the airfoil operates to increase the airfoil's sectional lift values, when sectional lift is decreasing on the lower surface of the airfoil. The controller 100 controls the oscillating air jet assembly on the lower surface of the airfoil only until the vortex reaches the airfoil's leading edge 193. Thus, the oscillating air jet assembly on the lower surface is active only before and during Event A.

The upper pressure sensor 105 and the lower pressure sensor 110 operate to detect a change in the sign of the temporal variation of the differential pressure, which is proportional to the airfoil's sectional lift Thus, the differential pressure is obtained at a first point in time by subtracting the pressure from the upper pressure sensor 105 from the pressure of the lower pressure sensor 110. This differential pressure will remain negative during Event A, while the vortex is upstream of the airfoil's leading edge 193, and the temporal gradients will also remain negative. Once the vortex moves beyond the airfoil's leading edge 193, the differential pressure becomes positive and their temporal gradients also become positive. The gradient is determined by comparing a current sensed differential pressure with a previously sensed or user-input differential pressure. A memory location can be used to store the previously sensed differential pressure, or the user-inputs, with the current sensed differential pressure.

At the transition between Event A and Event B, the lower surface oscillating airjet assembly is deactivated by the controller 100, and the upper surface oscillating air jet assembly is activated by the controller 100. By activating the upper surface oscillating airjet assembly, the controller 100 attempts to reduce or neutralize the rate at which the airfoil's lift is increasing by virtue of the interaction of the airfoil with the vortex. Since negative lift values are achieved by activating an upper surface oscillating airjet assembly, the rapid increase in lift is indeed attenuated.

Figure 16:
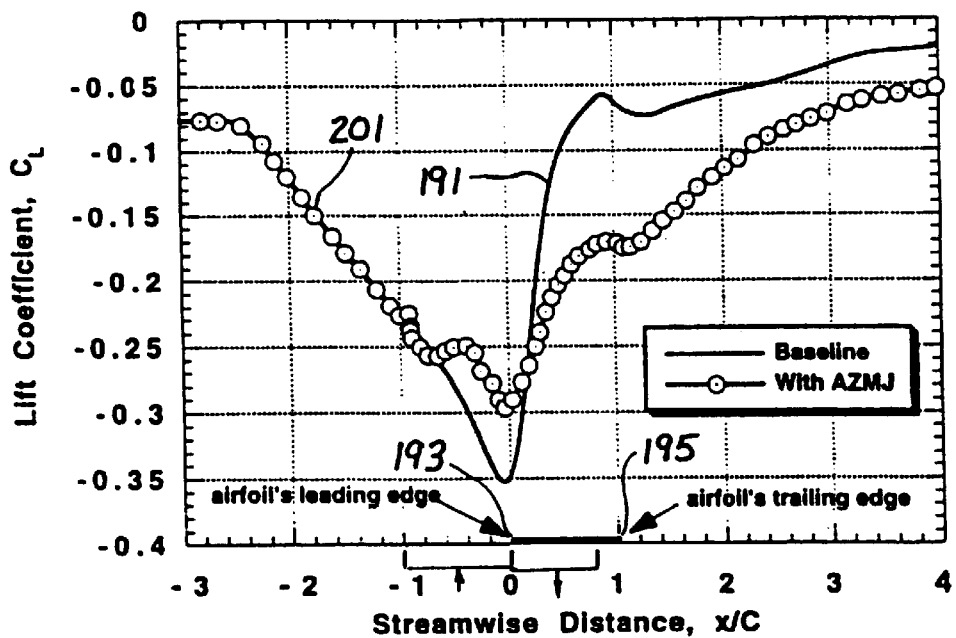

FIG. 16 illustrates a plot of lift coefficient versus streamwise distance for the situation of FIG. 15. In this plot, the peak jet velocity is equal to 0.05 and the jet oscillation frequency is equal to 100.5 Hz. In this simulation, represented by the plot 201 in FIG. 16, the lower surface oscillating airjet assembly was activated when the vortex was approximately at a distance of one chord length ahead of the airfoil. The upper surface oscillating air jet assembly was deactivated when the vortex reached the airfoil's 0.75 C chord position. The plot 191 of FIG. 15, depicting the original uncompensated airfoil response to the vortex passage, is also shown in FIG. 16. An approximately 55 percent reduction in the peak-to-peak lift values is achieved with the control technique of the present invention, according to the simulation. The reduction and the associated decrease in the temporal rates of variation of the airfoil's sectional lift translate into lower BVI noise levels.

Since BVI is typically felt by at least the outboard 40–50% of the rotor blade, the present invention contemplates multiple oscillating air jet assemblies along the length of the rotor blade. In addition to oscillating air jet assemblies incorporating cones or pistons, other oscillating air jet assemblies, such as the diaphragm disclosed in FIG. 1, for example, are contemplated by the present invention. In an embodiment having multiple oscillating air jet assemblies along the outboard 40–50% of the rotor blade, operation of the device is generally dependent on the sensitivity of the leading edge pressure sensors and detecting changes in the signs of the temporal gradients of the differential pressures. Also, since multiple interactions are usually present in helicopter rotor BVI, the frequency of the activation/deactivation of the lower and upper oscillating air jet assemblies will be proportional to the number of interactions being detected, for a given rotor blade radial station. The peak jet velocities and/or the jet oscillation frequencies may be tailored to the particular radial station, using higher peak jet velocities for the stronger interactions occurring near the tip of the rotor blade and lower peak velocities for the weaker interactions which occur at the more inboard radial stations of the rotor blade.

Since the oscillating air jet assemblies of the present invention do not require external equipment for adding and subtracting air mass, complex control systems for administering air to the rotor blades are not required. The power requirements for the oscillating air jet assemblies of the present invention are relatively small. For example, the piezoelectric cells comprising the diaphragm of FIG. 1 are typically driven with power requirements on the order of a few miliwatts.

The oscillating airjet assemblies of the present invention are able to change the local aerodynamics of the airfoil (blade) independent of the vortex strength, the blade/vortex separation distances, and the number of the blade/vortex encounters. Peak jet velocity and oscillation frequency are adaptable to changing BVI conditions which are associated with changes in the descent rate and forward flight speed. The adaptability of peak jet velocities and oscillation frequencies to changing BVI conditions, according to the present invention, presents an advantage over passive BVI noise control systems. Applications of the oscillating airjet assemblies of the present invention can be especially useful in low speed descent flight conditions, which typically give rise to BVI noise.

Figure 17:
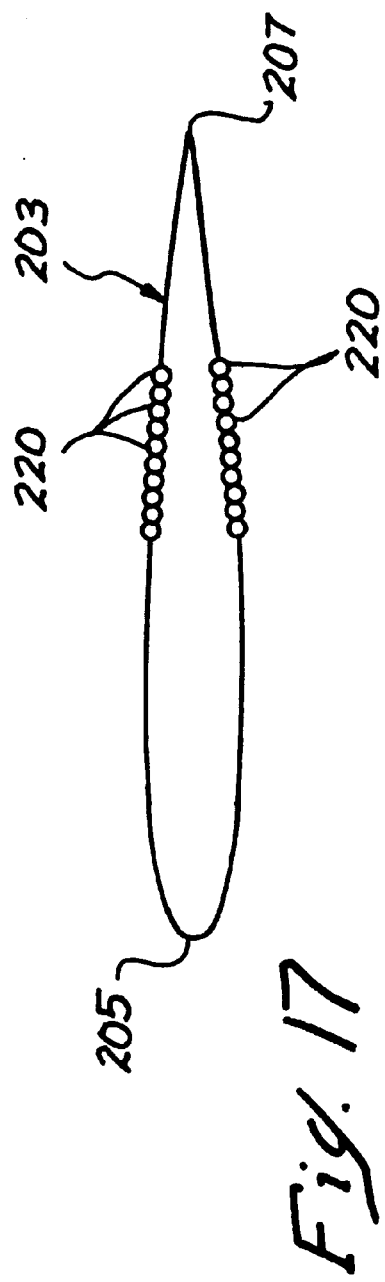
FIG. 17 is a schematic cross-sectional view of a rotor blade having a plurality of oscillating airjet assemblies on an intermediate chord position thereof.

Turning now to FIG. 17, a rotor blade 203 is illustrated comprising a leading edge 205 and a trailing edge 207. Arrays of oscillating air jet assemblies 220 are disposed on upper and lower surfaces of the rotor blade 203 for reducing high-speed impulsive (HSI) noise. The oscillating air jet assemblies 45 of FIG. 17 may be disposed on only one of the two surfaces of the rotor blade 205 in alternative embodiments. Similarly, either or both of the arrays of oscillating air jet assemblies 220 may be disposed at other positions on the rotor blade for other purposes.

Placement of the oscillating airjet assemblies 45 on either the upper, the lower, or both surfaces of the rotor blade 205 results in substantial changes to the original aerodynamic characteristics of the rotor blade 205. In the embodiment of FIG. 17, each array of oscillating air jet assemblies 220 extends for a distance of about 15 percent of the airfoil (rotor blade/wing) 203 chord length. Each array of oscillating air jet assemblies 220 is preferably centered about the 55 percent to 60 percent rotor blade chord position. The arrays of oscillating air jet assemblies 220 can be thoughtfully placed and precisely actuated, in a variety of ways, to reduce the strength of local shock waves known to be responsible for HSI noise.

Figure 18:
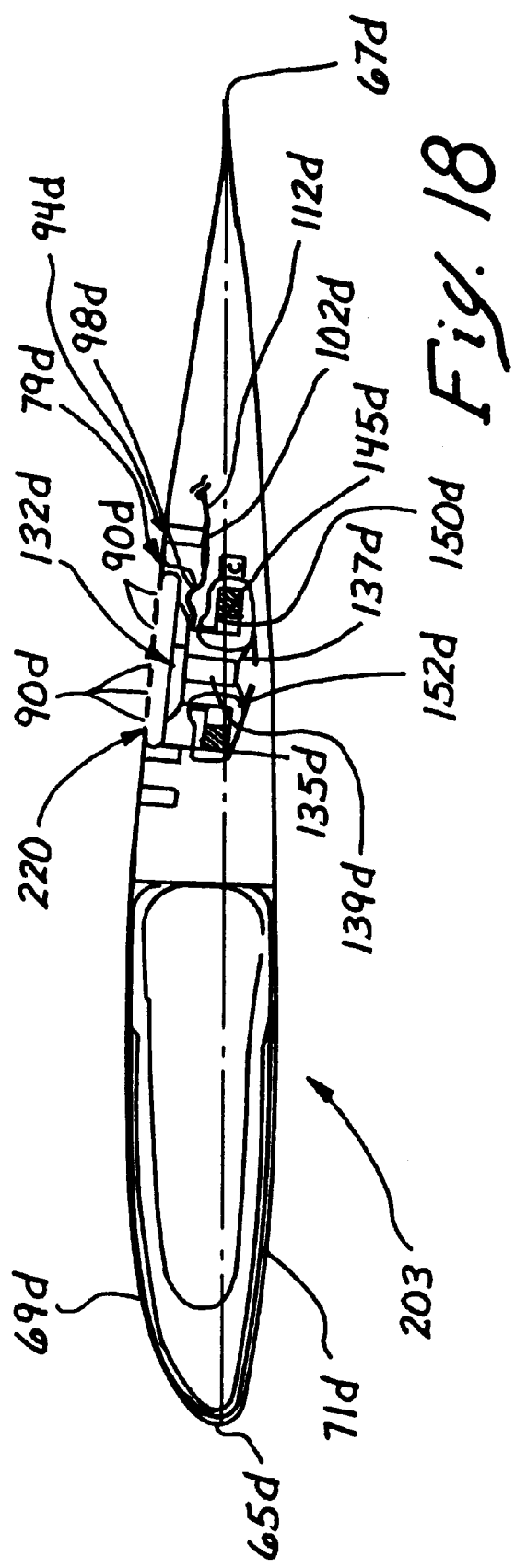
FIG. 18 is a cross-sectional view of a rotor blade having an oscillating airjet assembly disposed therein in accordance with a presently preferred embodiment of the invention.

The oscillating air jet assemblies 220 may comprise oscillating diaphragms, such as disclosed in FIG. 1 or, alternatively, may comprise other means for generating an oscillating air jet assembly, such as disclosed in FIGS. 4–7 and FIG. 18, for example. FIG. 18 is a cross-sectional view illustrating an oscillating air jet assembly 220 installed within a rotor blade 203. The embodiment of FIG. 18 generally corresponds to the embodiment of FIG. 6, and like elements are designated with like numerals followed by the letter "d." A piston 132d, which preferably comprises an aluminum honeycomb material, is held in place by a first diaphragm 135d and a second diaphragm 137d. Both the first diaphragm 135d and the second diaphragm 137d preferably comprise a silicone rubber having a fiberglass reinforcement. A connecting member 139d, which preferably comprises aluminum, connects the piston 132d to the second diaphragm 137d.

A sealed volume of air between the piston 132d and the plurality of apertures 90d is relatively small in the embodiment of FIG. 18, facilitating the generation of high jet pressures by the piston 132d. In the embodiment of FIG. 18, for example, a first core 150d and a second core 152d are coupled to the magnet 145d, to channel the magnetic flux from the magnet 145d to the voice coil. The first core 150d and the second core 152d form a gap, which accommodates the voice coil therein. The first core 150d and the second core 152d help to align the voice coil, and further help to stabilize the voice coil and prevent the voice coil from contacting and rubbing against the cores 150d and 152d.

In the illustrated embodiment of FIG. 18, only one oscillating airjet assembly 220 is disposed on the rotor blade 203. The oscillating air jet assembly 220 is illustrated disposed on the upper surface 69d of the rotor blade 203. Should a second array be used on the lower surface 71d, the chord position of the second array of oscillating air jet assemblies can be shifted forward or aft from the upper surface array. For example, the chord position of the lower oscillating air jet assembly can comprise the 40% to 55% chord locations. In the illustrated embodiment, the upper oscillating air jet assembly 220 extends between the 50% and the 65% chord positions.

If the local flow conditions give rise to the formation of two rather than one supersonic flow pockets on both the upper and the lower surfaces of the rotor blade, then two arrays of oscillating airjet assemblies can be incorporated on both the upper surface 69d and the lower surface 71d. In principle, regardless of the location and the number of supersonic flow pockets, the operation as well as the benefits of the arrays of oscillating airjet assemblies are similar. The arrays of oscillating air jet assemblies can be operated at different peak velocities for the same oscillation frequency, different oscillation frequencies for the same peak velocity, or different peak velocities and oscillation frequencies, in order to address different strengths of shock waves on the upper and lower surfaces of the rotor blade 203. The below numerical simulations demonstrate benefits associated with using an array of oscillating air jet assemblies for reducing the strength of a shock wave on the upper surface of an airfoil. Although the numerical simulations were conducted for only one surface of the airfoil, the results are extensible to illustrating the benefits of two, rather than one, arrays of oscillating air jet assemblies.

In the numerical simulations, ten individual oscillating air jet assemblies clustered over 15% of the airfoil chord constituted an array of oscillating air jet assemblies. The array of oscillating air jet assemblies was numerically disposed on the upper surface of the airfoil between the nondimensional chord positions of 0.5 and 0.65. All numerical simulations were conducted using a 2-D, time accurate Navier-Stokes flow solver assuming fully turbulent flow. In order to simulate the beneficial effects of the array of oscillating airjet assemblies, a modified boundary condition was implemented into the flow solver to allow for the modeling of the oscillating air jet assemblies at the user-prescribed locations of the oscillating air jet assemblies. The instantaneous jet velocities were prescribed using the below harmonic function:

$$q(T)=vn*\mathrm{Sin}(2\pi fT) \qquad \text{Equation 1}$$

where T is nondimensional time, normalized by the product of free stream speed of sound and the airfoil chord length; vn is the normalized peak jet velocity normalized by free stream speed of sound; and f is the jet oscillation frequency in Hz normalized by the product of the free stream velocity and airfoil chord length.

Figure 19:
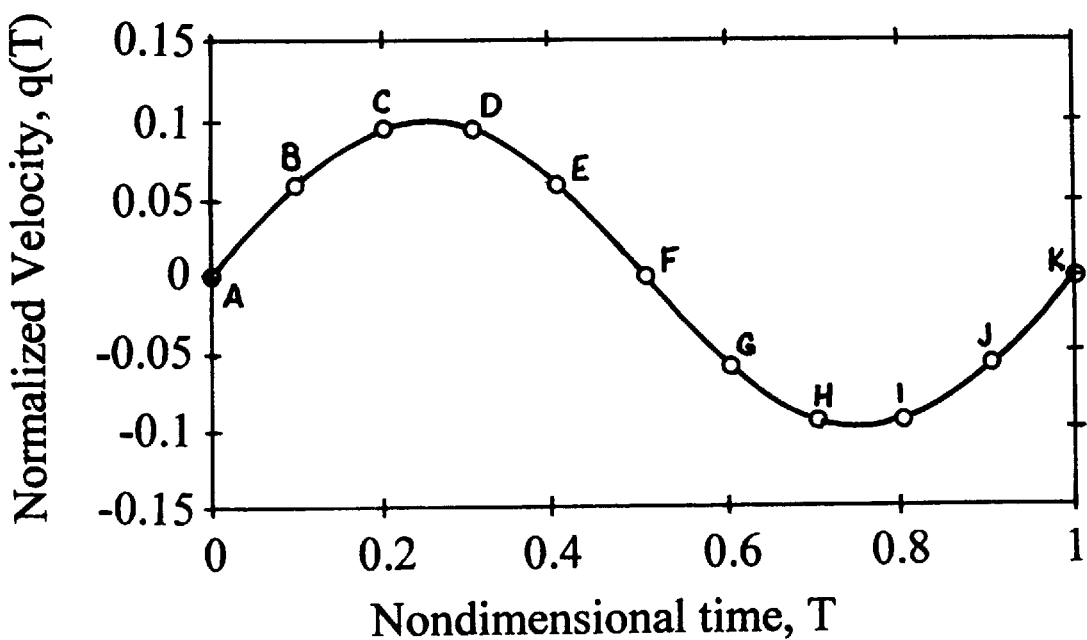
FIG. 19 is a plot of normalized jet velocity versus nondimensional time for a number of diaphragms on an airfoil for reducing high-speed impulsive (HSI) noise.

FIG. 19 is a plot of nondimensional time versus normalized velocity, depicting the prescribed transpiration boundary condition for all of the oscillating air jet assemblies which were assumed in the simulation to operate in unison without phase shift. The nondimensional time required for one complete jet oscillation cycle was set in the simulation to equal 1. In order to promote the formation of a strong shock wave on the upper surface of the airfoil, a free stream angle of attack of 1 degree and a free stream Mach number of 0.80 were assumed. All calculations for the baseline airfoil (uncontrolled problem) and for the airfoil with the proposed array of oscillating airjet assemblies (control problem) were performed for a Reynolds number of 3 million. For both the baseline and the controlled problems, in order to clearly illustrate the size of the predicted supersonic flow pocket(s) on the upper surface of the airfoil, only plots of the predicted Mach number contours for local Mach numbers of 1 and higher are presented.

Figure 20:
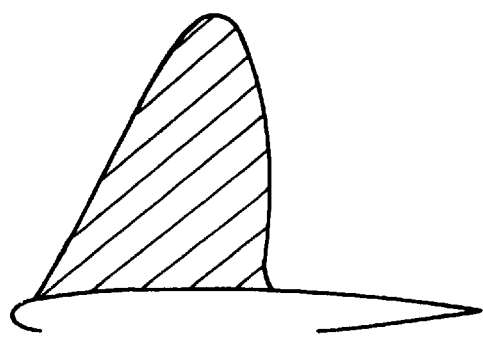
FIG. 20 is a schematic representation of a predicted supersonic flow pocket on an upper surface of a rotor blade.
Figure 21A:
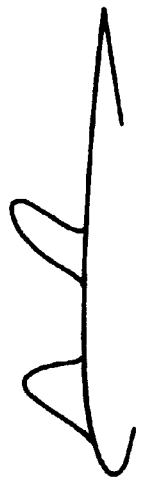
Figure 21B:
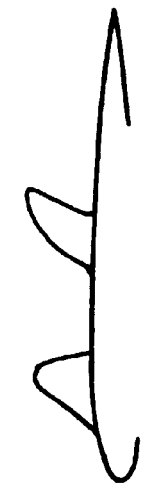
Figure 21C:
Figure 21D:
Figure 21E:
Figure 21F:

FIG. 20 illustrates the chordwise extent of the predicted supersonic flow pocket on the upper surface of the simulated airfoil. The results obtained from the simulation indicate that the peak Mach number ahead of the shock wave (used as one of the measures for the strength of the shock wave) is equal to about 1.36.

FIGS. 21a–21k illustrate the predicted supersonic pockets on the upper surface of the airfoil for one complete air jet oscillation cycle. The predicted figures obtained from the simulation correspond to the time instance given by the letters a–k shown in FIG. 19. The results therefore represent snapshots of the predicted local supersonic flow pockets as a function of time or, equivalently, instantaneous jet velocity q(T). In this simulation, the normalized peak amplitude of the jet velocity was equal to 0.10 and the jet oscillation frequency was equal to 1585 Hz. Below each plot in FIGS. 21a–21k, the predicted local peak Mach number (Mp) is shown to provide a sense for the strength of the terminating shock wave. The results indicate that the average peak Mach number ahead of the shock wave during one complete cycle of jet oscillation is equal to 1.18, which indicates a reduction of about 13 percent. FIG. 21l provides a reference baseline and is equivalent to FIG. 20. Additional reductions in the magnitude of the local peak Mach numbers and, hence, the strength of the shock waves, may be achieved with additional refinements in the jet peak velocities, the jet oscillation frequencies, and/or the chordwise placements of the oscillating air jet assemblies. The illustrated simulation represents a combination of these variables, which was not necessarily optimized for achieving the minimum peak Mach numbers.

The oscillating air jet assemblies in the illustrated embodiments for reducing HSI noise are advantageously adapted to change the local flow characteristics over the rotor blade (or airfoil/wing) independent of the shockwave strength or, equivalently, the operating condition. In passive control techniques of the prior art, the aerodynamic performance of the entire rotor blade is degraded at operation conditions other than the designed one. Changes in shockwave strength due to changes in blade azimuth and rotor advance ratio can be accommodated by adjustment of the peakjet velocity and/or oscillation frequency of the oscillating air jet assemblies. Prior art passive HSI shockwave/noise control techniques do not provide any similar accommodation capability.

The oscillating air jet assemblies of the present invention can be used to alter the strength of the shockwave and/or its chordwise position, to thereby mask the HSI noise signature of a military rotorcraft and reduce the detectability of the military rotorcraft. By properly adjusting the performance parameters of the oscillating air jet assemblies, such as the peak jet velocity and/or the oscillation frequency, the HSI noise signature of a military rotorcraft can be altered, to thereby emulate a noise signature of a commercial aircraft. Additional oscillating air jet assemblies may be used alone or in combination with air jet assemblies along the airfoil surface for reducing HSI noise. The flexibility provided by the relatively-simple oscillating air jet assemblies enables the performance of multiple, unrelated tasks through the local manipulation of the characteristics of the flow over various surfaces for achieving one or more desired affects. Substantial geometrical modifications to the surfaces, which accommodate the oscillating air jet assemblies, are not required.

Although exemplary embodiments of the invention have been shown and described, many other changes, modifications and substitutions, in addition to those set forth in the above paragraphs, may be made by one having ordinary skill in the art with out necessarily departing from the spirit and scope of this invention.

What is claimed is:

1. An active control system for use on an aerodynamic structure having an outer skin surrounding an interior volume, the active control system comprising:
   an array of apertures disposed in the outer skin and providing fluid communication from the exterior of the outer skin to a portion of the interior volume;
   a diaphragm positioned in the interior volume and being displaceable between a first position and a second position, an actuating surface of the diaphragm being exposed to the portion of the interior volume such that displacement of the diaphragm between the first and second position moves air through the apertures;
   a drive mechanism positioned in the interior volume and connected to displace the diaphragm between the first and second positions and therefore generate an oscillating air jet by virtue of the air movement through the apertures;
   at least one sensor mounted on the aerodynamic structure and positioned to sense a parameter on the exterior of the outer skin; and
   a controller connected to receive from the sensor information on the parameter and connected to operate the drive mechanism in response to the parameter information.

2. The system of claim 1, wherein the at least one sensor comprises a pressure sensor.

3. The system of claim 1, wherein the sensor is located on a leading edge of the outer skin of the aerodynamic structure.

4. The system of claim 3, wherein the sensor is located within the leading 5% of the chord of the aerodynamic structure.

5. The system of claim 1, wherein the array of apertures is spaced apart along the outer skin of the aerodynamic structure so as to span a distance of approximately 15% of the chord of the aerodynamic structure.

6. The system of claim 1, wherein the drive mechanism comprises a piezo-electric actuator.

7. The system of claim 1, wherein the drive mechanism comprises a voice coil.

8. The system of claim 1, wherein the outer skin of the aerodynamic structure defines an upper surface and a lower surface, and wherein an upper array of the apertures is located on the upper surface and a lower array of the apertures is located on the lower surface, the system including two drive mechanism subsystems comprising one of the diaphragms and one of the drive mechanisms, an upper subsystem being configured to generate an oscillating air jet through the upper array of apertures, and a lower subsystem being configured to generate an oscillating air jet through the lower array of apertures.

9. The system of claim 8, wherein the upper array of apertures is located between about 50–65% chord position.

10. The system of claim 9, wherein the lower array of apertures is located between about 40–55% chord position.

11. The system of claim 8, wherein the lower array of apertures is located between about 40–55% chord position.

12. An active control system for use on an aerodynamic structure having an outer skin surrounding an interior volume, the active control system comprising:
    an array of apertures disposed in the outer skin and providing fluid communication from the exterior of the outer skin to a portion of the interior volume, wherein the array of apertures is spaced apart along the outer skin of the aerodynamic structure so as to span a distance of approximately 15% of the chord of the aerodynamic structure;
    a diaphragm positioned in the interior volume and being displaceable between a first position and a second position, an actuating surface of the diaphragm being exposed to the portion of the interior volume such that displacement of the diaphragm between the first and second position moves air through the apertures; and
    a drive mechanism positioned in the interior volume and connected to displace the diaphragm between the first and second positions and therefore generate an oscillating air jet by virtue of the air movement through the apertures.

13. The system of claim 12, further including:
    at least one sensor mounted on a leading edge of the aerodynamic structure and positioned to sense a parameter on the exterior of the outer skin; and
    a controller connected to receive from the sensor information on the parameter and connected to operate the drive mechanism in response to the parameter information.

14. The system of claim 13, herein the at least one sensor comprises a pressure sensor.

15. The system of claim 12, wherein the drive mechanism comprises a piezo-electric actuator.

16. The system of claim 12, wherein the drive mechanism comprises a voice coil.

17. The system of claim 12, wherein the outer skin of the aerodynamic structure defines an upper surface and a lower surface, and wherein an upper array of the apertures is located on the upper surface and a lower array of the apertures is located on the lower surface, the system including two drive mechanism subsystems comprising one of the diaphragms and one of the drive mechanisms, an upper subsystem being configured to generate an oscillating air jet through the upper array of apertures, and a lower subsystem being configured to generate an oscillating air jet through the lower array of apertures.

18. The system of claim 17, wherein the upper array of apertures is located between about 50–65% chord position.

19. The system of claim 18, wherein the lower array of apertures is located between about 40–55% chord position.

* * * * *